Aug. 20, 1946.　　　A. NEWPORT　　　2,406,158
HAND TRUCK
Filed May 25, 1945
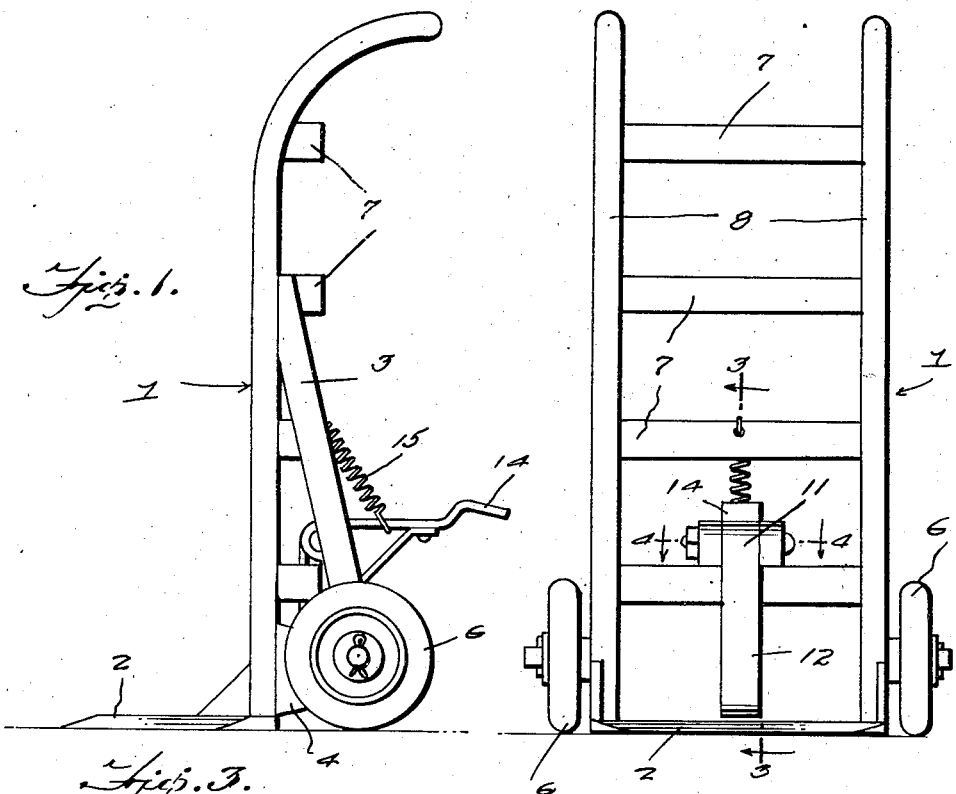
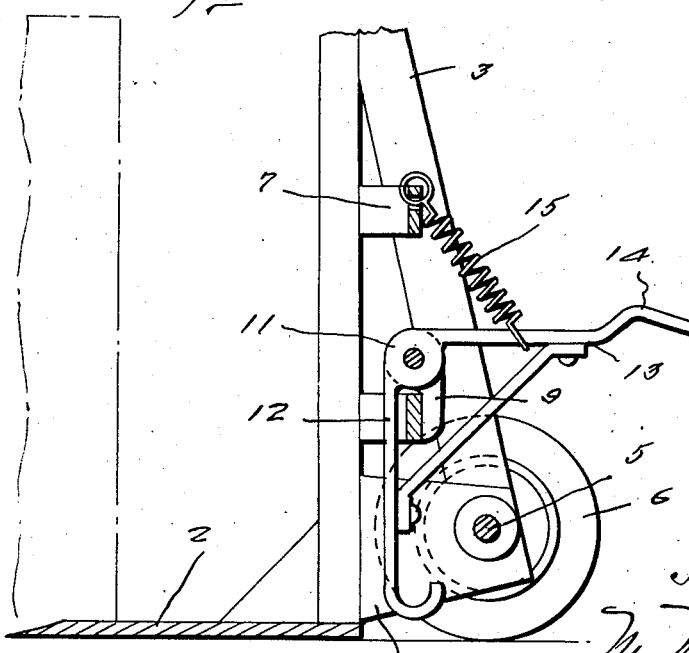
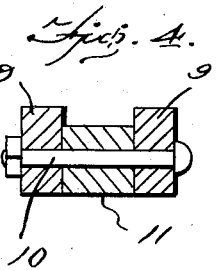
Inventor
Alba Newport Patented Aug. 20, 1946

2,406,158

UNITED STATES PATENT OFFICE 2,406,158

HAND TRUCK

Alba Newport, Kokomo, Ind.

Application May 25, 1945, Serial No. 595,794

3 Claims. (Cl. 214—82)

This invention relates to hand trucks, and more particularly to a hand truck equipped with load-stacking means.

A main object of the invention is to provide a novel and improved hand truck structure wherein pedal-actuated means for removing the load by forward displacement is provided.

A further object of the invention is to provide an improved two-wheeled hand truck provided with simple and effective load-shifting means for unloading the truck by forward displacement of the load without manual contact of the operator with the load.

Further objects and advantages of the invention will appear from the following description and claims, and from the accompanying drawing, wherein:

Figure 1 is a side elevational view of an improved hand truck in accordance with this invention.

Figure 2 is a front elevational view of the hand truck of Figure 1.

Figure 3 is a cross-sectional view taken on line 3—3 of Figure 2.

Figure 4 is a cross-sectional view taken on line 4—4 of Figure 2.

Referring to the drawing, 1 designates the frame of a hand truck, said frame comprising vertical side bar elements 8, 8 connected by rearwardly curved transverse members 7 which act to rigidify the frame and also to support the load at times carried by the truck. The lower end of the frame is provided with a forwardly projecting plate member 2, adapted to be engaged under the load during the loading operation. Frame 1 is provided with side brackets 3, and bottom brackets 4 joined thereto and carrying a transverse shaft 5 on which load-carrying wheels 6, 6 are rotatively mounted.

Welded or otherwise rigidly secured to the lowermost transverse member 7 are a pair of spaced supporting members 9, 9 through the upper portions of which a bolt member 10 is secured. Journaled on said bolt member 10 between supporting members 9, 9 is a lever member 11 comprising a downwardly extending arm portion 12 and a rearwardly extending arm portion 13 provided with a treadle element 14. A coil spring 15 is connected between arm portion 13 and one of the upper transverse members 7 to bias the lever member 11 to a position wherein arm portion 12 is held substantially in the plane of transverse members 7.

The lower end of arm portion 12 is rearwardly curved to provide a rounded load-engaging surface.

In operation, the load is mounted on the truck in the conventional manner by engaging plate member 2 under the load by pushing the truck forwardly. The truck is then tilted rearwardly with the load resting against transverse members 7 and transported to the desired location. The truck is then released, allowing the load to resume its vertical position, and treadle 14 is actuated by the operator's foot. This rotates lever 11, causing arm portion 12 to thrust the load forwardly off the truck to its correct stacked position. In this manner the load may be correctly stacked without extra manipulation by the operator after it has been disengaged from the truck.

In addition to reducing the number of manual stacking operations required, the mechanical unloading feature permits the unloading of difficult and harmful materials such as rolls of barbed wire and the like without manual contact by the operator. A definite safety feature is thus provided.

While a specific embodiment of a hand truck has been disclosed in the foregoing description, it will be understood that various modifiations within the spirit of the invention may occur to those skilled in the art. Therefore, it is intended that no limitations be placed on the invention other than as defined by the scope of the appended claims.

What is claimed is:

1. A hand truck comprising a load-supporting frame, wheel means adjacent the lower end of the frame adapted to support said frame during transportation of the load, a lever member pivotally mounted on a transverse axis adjacent the lower end of the frame but spaced above said wheel means, said lever member comprising a first normally depending arm and a second normally rearwardly extending arm said first arm being adapted to exert a forward thrust on the load responsive to depression of the end of said second rearwardly extending arm, and spring means for biasing said first arm to a position substantially in the plane of said load-supporting frame.

2. The structure of claim 1, and wherein the lower end of said first arm is rearwardly curved to provide a rounded load-engaging surface.

3. A hand truck comprising a load-supporting frame composed of side members and cross members, wheels in one end of said frame to support the same, a kick-off treadle-actuated lever pivoted on one of said cross members in a plane intermediate of said side frame members and wheels and provided with a first arm normally extending downwardly and parallel to the plane of said frame and a second arm normally extending at right angles to the plane of said frame, and spring means anchored to another of said cross members and fastened to said second lever arm for urging the lever arm to said positions.

ALBA NEWPORT.